United States Patent [19]
Dufour

[11] Patent Number: 5,879,651
[45] Date of Patent: Mar. 9, 1999

[54] PROCESS FOR THE PREPARATION OF BASIC POLYALUMINUM CHLOROSULPHATES AND APPLICATIONS THEREOF

[75] Inventor: Pascal Dufour, Caluire, France

[73] Assignee: Elf Atochem S.A., France

[21] Appl. No.: 815,988

[22] Filed: Mar. 10, 1997

[30] Foreign Application Priority Data

Mar. 8, 1996 [FR] France .................................. 96 02947

[51] Int. Cl.$^6$ ................................ C01F 7/00; C01F 7/68
[52] U.S. Cl. ........................ 423/463; 423/556; 423/600; 423/467; 210/723
[58] Field of Search ..................................... 423/463, 556, 423/600, 467; 252/175; 210/723

[56] References Cited

U.S. PATENT DOCUMENTS

| | | | |
|---|---|---|---|
| 3,929,666 | 12/1975 | Aiba et al. | 423/556 |
| 5,008,095 | 4/1991 | Boutin | 423/556 |
| 5,246,686 | 9/1993 | Cuer et al. | 423/556 |
| 5,348,721 | 9/1994 | Murphy et al. | 423/463 |

FOREIGN PATENT DOCUMENTS

| | | | |
|---|---|---|---|
| 21 8487 | 4/1987 | European Pat. Off. | 423/556 |
| 53-77899 | 7/1978 | Japan | 423/463 |
| 7607782 | 8/1981 | Sweden | 423/556 |
| 93/00295 | 1/1993 | WIPO | 423/556 |

OTHER PUBLICATIONS

Patent Abstracts of Japan, vol. 002, No. 015 (C–002), 31 Jan. 1978, JP–A–52 113384.

Patent Abstracts of Japan, vol. 002, No. 046 (C–009), 28 Mar. 1978, JP–A–53 001699.

*Primary Examiner*—Ngoc-Yen Nguyen
*Attorney, Agent, or Firm*—Millen, White, Zelano, & Branigan, P.C.

[57] ABSTRACT

The present invention relates to a process for the preparation of basic polyaluminium chlorosulphates. This process consists, after basification, in carrying out cooking at a temperature between 60° C. and 95° C. such that the cooking time is proportionately shorter than the higher cooking temperature. The polychlorosulphates obtained according to the process of the invention can be used for the treatment of drinking water, effluents and in the paper industry.

19 Claims, 1 Drawing Sheet

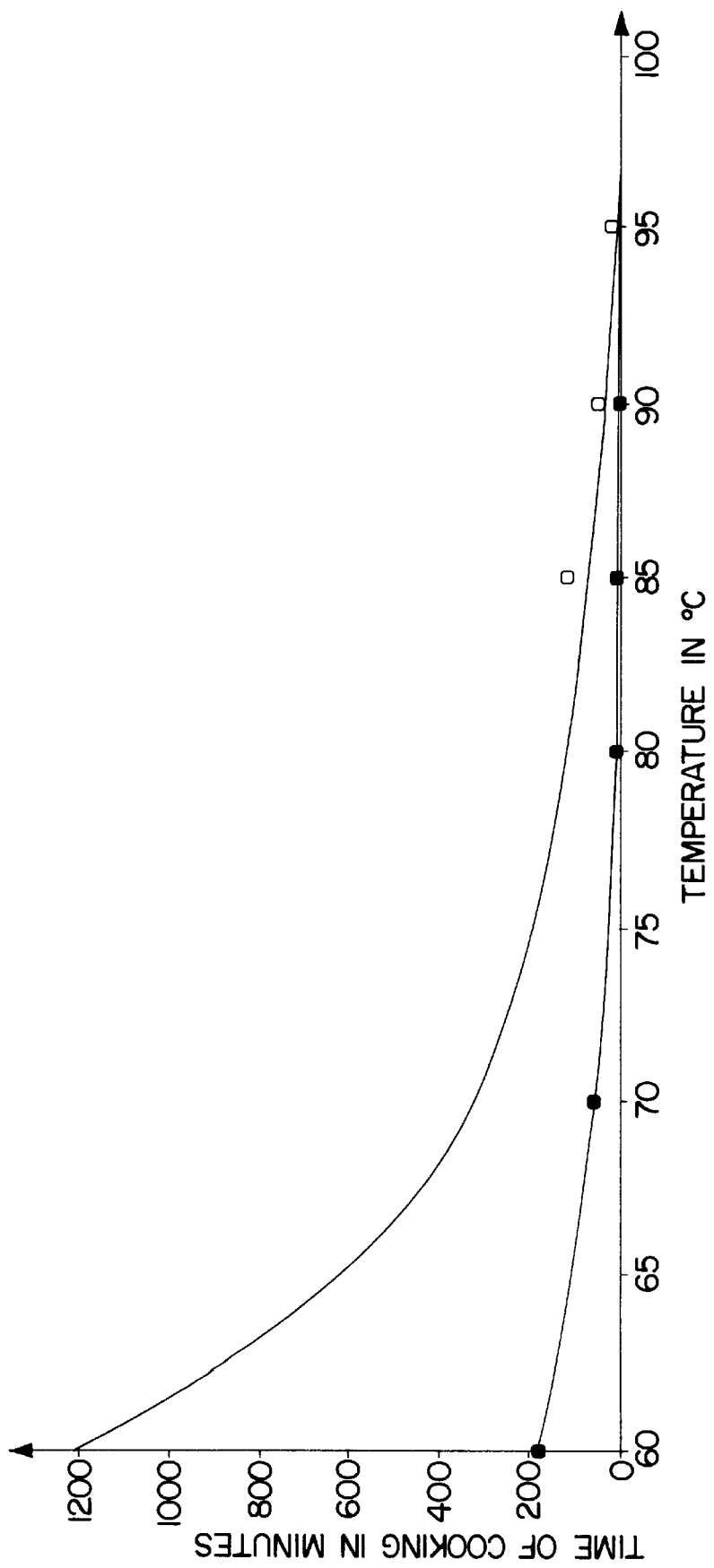

PROCESS FOR THE PREPARATION OF BASIC POLYALUMINUM CHLOROSULPHATES AND APPLICATIONS THEREOF

The present invention relates to a process for the preparation of aluminium of high basicity and to the application of these polyaluminium chlorosulphates to the treatment of drinking water, aqueous effluents and in the paper industry. Polyaluminium chlorosulphates have the general formula:

$$Al(OH)_a Cl_b Y_c / dM'Cl_2 / eM''Cl \qquad (I)$$

in which Y represents an anion of valency 2, such as
$SO_4^{2-}$, M' represents a cation of valency 2, such as an alkaline-earth metal, M'' represents a cation of valency 1, such as an alkali metal or ammonium, a, b, c and d are non-zero positive integers or positive fractions, e may be zero or a positive integer or positive fraction, $b=3-2c-a$ and $2d+e+b \leq 3$.

The basicity β is defined by the ratio a/3 expressed as a %, and it may range from 20 to 75%. Starting with a chemical composition, it may be calculated by the following formula:

β32 100(3Al+2M'+M''−2Y−Cl)/3 Al in which Al, M', M'', Y and Cl are expressed in moles.

Polyaluminium chlorosulphates, referred to hereinbelow as PACS, are widely used in industry, in particular in papermaking and for the treatment of waste water and especially drinking water, where their high quality of coagulation and flocculation make them a choice product.

More precisely, for the treatment of waters, processes are desired which avoid any formation of effluent, in particular of gypsum ($CaSO_4 \cdot 2H_2O$) and which make it possible to manufacture products having capacities for flocculation-coagulation of materials in suspension in drinking water, capacities of releasing only very little soluble aluminium into treated drinking water and a stability on storage of the PACS solutions over several months, that is to say including temperature variations between 0° C. and 40° C., or even more if the storage is not protected from the sun's rays.

Patent EP 327,419 describes a process for the manufacture of high-basicity PACS which satisfies the capacities and stability as mentioned above. However, this process generates a gypsum effluent whose discharge into river water poses environmental problems and whose dumping entails additional costs.

The efficacy of flocculation-coagulation is evaluated by measuring the turbidity of the supernatant water phase after treatment with a PACS. Large flocs having properties of rapid separation after settling has taken place settle out, whereas the smallest flocs can be entrained on a sand filter and must have an excellent capacity to be absorbed on a sand filter. The efficacy of the thorough filtration on a sand filter is characterized by the number of particles per $cm^3$ which are found in the clarified waters.

The capacity to release only a very low residual content of aluminium into drinking water is evaluated by filtering the treated water through a 0.45 μm filter and assaying the aluminium present.

A PACS in solution is said to be stable if it retains its applicative properties after storage for 3 months at room temperature and for 1 month at 40° C. and if it deposits no solid, at 40° C. over one month or at room temperature (25° C.) over three months.

Several problems were posed in the common applications of PACSs, resulting in particular from the processes for their manufacture.

Elimination of the turbidity, which is directly associated with the flocculation-coagulation, requires a high sulphate content and a low temperature for the basification step, below 70° C., preferably below 40° C. When the sulphate content is high, PACSs have a resistance to high temperature. Without having a negative impact on the elimination of the turbidity, it then becomes possible to carry out syntheses above 70° C., for example between 80° C. and 90° C. for a ratio of the sulphate/alumina percentages by mass of greater than 3/10.5.

The treatment of drinking water requires the production of a low residual aluminium content in the treated water, which implies a high basicity of the PACSs, of between 60% and 75%. The residual aluminium content in the treated water decreases when PACSs synthesized at high temperatures in the basification step, typically above 70° C. and preferably between 80° C. and 85° C., are used. When the ratio of the sulphate/alumina percentages by mass increases from 0.1/10 to 3/10, the residual aluminium content rapidly increases to stabilize at the ratio 3/10 up to 23.8/8.5. The residual aluminium contents are too high for a ratio of the sulphate/alumina percentages by mass of greater than 0.1/10.

In order to obtain PACSs which are effective in terms of residual aluminium, it is necessary to have PACSs of high basicity, a high temperature for the basification step and a very low sulphate content in the PACSs. A high temperature and a low sulphate content are, however, conditions opposed to the production of PACSs which are effective in eliminating the turbidity.

PACSs in solution must be stable on storage and at temperatures up to 40° C. The temperature-stability of PACSs in solution increases as the sulphate/alumina mass ratio increases. PACSs in solution are often very stable for ratios of the sulphate/alumina percentages by mass of greater than 3/10.

In Japanese patent JP-53 001699/1978, a process is described for the manufacture of polyaluminium chlorosulphate. This process consists, in a first step, in basifying a polychlorosulphate containing a lot of sulphate with an equimolar amount of $CaCO_3$, leading to the production of gypsum ($CaSO_4 \cdot 2H_2O$) which is separated out. In a second step, the product of the previous step, whose basicity is between 55% and 58%, is reacted with a compound chosen from the group consisting of $CaCO_3$, $NaHCO_3$, $Na_2CO_3$, $Mg(OH)_2$ and MgO, without exceeding the temperature of 60° C. Although the basicity is between 65–70%, the residual aluminium contents in the treated waters are 30% to 60% higher than those obtained with the PACSs obtained according to the process described in the abovementioned patent EP 327,419. A temperature of 60° C. is insufficient and a temperature above 70° C. degrades the flocculation-coagulation properties. The main drawback of this process lies in a considerable production of byproduct gypsum whose disposal poses environmental problems, as has already been mentioned above.

Patent JP 52 113384/1977 describes a process for the manufacture of 65–70% basic polyaluminium chlorosulphate by addition of an alkaline agent such as $CaCO_3$, $NaHCO_3$, $Mg(OH)_2$ and/or MgO to a solution of aluminium chloride or basic aluminium chloride, still at a temperature below 60° C. It is observed that the residual aluminium contents are again too high when compared with the PACSs obtained according to the process described in patent EP 327,419, for the same reasons as those explained in patent JP-53 001699/1978 above. A large amount of gypsum is by-produced, which remains a drawback.

Canadian patent application CA 2,109,756 A1 describes the manufacture of a flocculant, without generation of gypsum, by adding gypsum to a solution of aluminium chlorosulphate at a temperature between 45° C. and 98° C., preferably 75° C. The gypsum thus added is totally dissolved; the calcium concentration remains limited in a range of from 0.1% to 0.4% of $Ca^{2+}$. It is clearly pointed out that the basification step with a base such as, for example, $CaCO_3$ must be performed at 45° C. The basicity of the product, as obtained according to that patent, is less than 55%. The ratio of the sulphate/alumina percentages by mass is in the region of 3/10. However, when the examples were repeated, it was not possible to reproduce the stated basicities of 55%, but instead lower basicities were found, between 10% and 15%. The residual aluminium contents are excessive when compared with the PACSs obtained according to the process described in patent EP 327,419.

For the purpose of improving the residual amount of aluminium remaining in a treated water, the abovementioned patent EP 327,419 proposes a process for the preparation of PACS of high basicity, between 60% and 70%. This process consists in particular in placing a solution of aluminium, of chloride and of excess sulphate in contact with a basic alkaline-earth compound, in lowering the temperature from 93° C. to 65° C. and then in removing the insoluble alkaline-earth metal sulphate by filtration. It should be noted that the synthesis is started in a large excess of sulphate and that, simultaneously with the lowering of the temperature, the sulphate content in the reaction medium decreases. Thermal degradation of the PACS solutions, which are sensitive to low levels of sulphate, is thus avoided; typically for this product $SO_4^{2-}$=1.9%, $Al_2O_3$=10.5%. The PACSs of high basicity thus obtained make it possible to obtain lower residual aluminium contents in the treated water, as has already been mentioned previously. However, this process has the major drawback of generating large amounts of gypsum (about 300 kg per ton of PACS produced).

Patent EP 557,153 also describes a process for the preparation of PACS of high basicity, which leads to few effluents. However, this process has the serious drawback of being difficult to reproduce. This lack of reproducibility is shown in particular by the production of a high level of residual aluminium in the treated water 8 times out of 10. This residual level of aluminium may reach an amount which is 40% higher than that obtained with the PACSs described in patent EP 327,419.

It is recalled that in order to obtain PACSs which are effective in terms of residual aluminium, it is necessary to have a PACS of high basicity, manufactured at a high basification temperature with a very low sulphate content in the PACSs. A high temperature and a low sulphate content are conditions that are opposed to the production of PACS which are effective in eliminating the turbidity.

This has been observed in particular in patent FR 2,317,227 and European patent EP 0,557,153, in which it is impossible to overbasify a 40% basic aluminium chlorosulphate to about 55–70%, with a base, at a temperature above 70° C. without avoiding degradation of the flocculent properties of the products. The temperature range mentioned in the above two patents is 40° C. to 70° C. for the first and from 50° C. to 70° C. for the second. The products described in patent FR 2,317,227 have basicities of between 40% and 55%, as compared with 65% to 75% for patent EP 0,557,153 A1. The ratio of the $SO_4^{2-}/Al_2O_3$ percentages by mass is less then 3/10.5.

According to patent EP 327,419, it is possible to work above 70° C. by starting the synthesis with an excess of sulphate which is precipitated as gypsum. It is also possible to work above 70° C. if a final product containing more than 3% $SO_4^{2-}$ for 10.5% $Al_2O_3$ is aimed at.

The problem to solve is thus one of obtaining stable PACSs having good flocculent properties with an ability to pass on little residual aluminium to the treated water, while at the same time being obliged to manufacture PACSs according to a process which produces the least possible amount of effluents. Furthermore, it is desired by PACS users that the smallest flocs should have good properties of absorption on sand filters.

SUMMARY OF THE INVENTION

A process has now been found for the preparation of polyaluminium chlorosulphate of high basicity, having the general formula:

in which

Y represents an anion of valency 2, such as $SO_4^{2-}$,

M' represents a cation of valency 2, such as an alkaline-earth metal,

M" represents a cation of valency 1, such as an alkali metal or ammonium, a, b, c and d are non-zero positive integers or positive fractions and e may be zero or a positive integer or positive fraction such that 1.8<a<2,25

0.001<c<0.150 b=3−2c−a and

2d+e+b≦3, and having a basicity β between 60% and 75%, and preferably between 65% and 70%, this basicity being defined by the formula β=100×(3Al+2M'+M"−2Y−Cl)/3Al in which Al, M', M", Y and Cl are expressed in moles, the said process consisting in placing a basic compound of an alkali metal, preferably in aqueous solution, and at least one basic compound of an alkaline-earth metal or a halide of an alkaline-earth metal, in aqueous suspension or in powder, in the presence of sulphate ions, in contact with a basic solution of aluminium chloride of formula:

in which x is a number between 0.1 and 1.5 and y=3−x, at a temperature between room temperature (about 25° C.) and 70° C., the said process being characterized in that after the basification, the reaction medium obtained is cooked at a temperature, known as the cooking temperature, between 60° C. and 95° C., such that the cooking time is between 3 h and 20 h, and preferably between 5 h and 9 h for a cooking temperature of 60° C. and such that the cooking time is between 5 minutes and 15 minutes, and preferably between 7 minutes and 10 minutes, for a cooking temperature of 95° C.

According to the present invention, the cooking times for cooking temperatures of 70° C., 80° C., 85° C. and 90° C. are given in the following table.

| TEMPER-ATURE | COOKING TIME | | |
|---|---|---|---|
| (°C.) | MINIMUM | OPTIMUM | MAXIMUM |
| 60 | 3 h | 5 h to 9 h | 20 h |
| 70 | 1 h | 1 h to 4 h | 5 h |
| 80 | 10 min | 30 min to 1 h 30 min | 1 h 45 min |
| 85 | 10 min | 30 min to 1 h | 1 h 15 min |
| 90 | 5 min | 15 min to 30 min | 45 min |
| 95 | 5 min | 7 min to 10 min | 15 min |

For all intermediate cooking temperatures, a person skilled in the art will proceed by extrapolation.

According to the present invention, the ratio of the sulphate/alumina percentages by mass is advantageously less than 3/10.5 and preferably between 1/10.5 and 1.5/10.5.

According to the present invention, the reactants are preferably placed in contact with vigorous stirring and/or with vigorous turbulence.

Thus, any means which makes it possible to obtain high turbulence, such as injection with a nozzle or venturi, may be used.

The cooking is advantageously carried out with stirring, which is preferably less vigorous than that performed when the reactants are placed in contact.

According to the present invention, the expression "basic compound of an alkali metal" denotes any derivative of the said alkali metal which has a basic nature, in particular oxide, hydroxide, carbonate or bicarbonate. By way of illustration of basic compounds of an alkali metal which can be used according to the present invention, mention will be made of NaOH, KOH, NaHCO$_3$, Na$_2$CO$_3$, K$_2$CO$_3$, KHCO$_3$ and mixtures of at least two of the basic compounds of an alkali metal listed above. Preferably, NaOH or Na$_2$CO$_3$ will be used.

These compounds are preferably used in the form of an aqueous solution. The molar concentration of basic compound of the alkali metal is at least equal to 2 mol/l and preferably between 4 mol/l and 7 mol/l.

According to the present invention, the expression "basic compound of an alkaline-earth metal" denotes any derivative of the said alkaline-earth metal which has a basic nature, in particular oxide, hydroxide, carbonate or bicarbonate.

By way of illustration of basic compounds of an alkaline-earth metal which can be used according to the present invention, mention will be made of CaO, MgO, Ca(OH)$_2$, Mg(OH)$_2$, CaCO$_3$ and mixtures of at least two of the basic compounds of an alkaline-earth metal listed above. Preferably, Ca(OH)$_2$, Mg(OH)$_2$ or MgO will be used.

By way of illustration of halide of an alkaline-earth metal which can be used according to the present invention, mention will be made of CaCl$_2$ and MgCl$_2$. Preferably, CaCl$_2$ will be used.

According to the present invention, the sulphate ions may be provided by compounds such as H$_2$SO$_4$, Na$_2$SO$_4$, CaSO$_4$, CaSO$_4$.2H$_2$O or MgSO$_4$. Preferably, H$_2$SO$_4$, Na$_2$SO$_4$ and Ca$_2$SO$_4$.2H$_2$O (gypsum) will be used.

According to the present invention, the reactants may be introduced in different orders and it has been demonstrated that the order of introduction of the reactants had no consequence on the quality of the PACSs obtained according to the present invention.

Thus, in particular, the basic solution of aluminium(II) chloride may be placed in contact simultaneously with the basic compound of an alkali metal and the sulphate, followed by introduction into the reaction medium thus obtained of the basic compound of an alkaline-earth metal (in suspension or in the form of a powder), or inversely, the solution may be placed in contact with the basic compound of an alkaline-earth metal, followed by simultaneous introduction of the basic compound of an alkali metal and the sulphate.

According to another variant, the basic solution of aluminium(II) chloride and CaCl$_2$ may be placed in contact, followed by simultaneous introduction into the reaction medium thus obtained of the basic compound of an alkali metal and the sulphate.

The prior processes made it possible to improve one or more characteristics to the detriment of one or more other characteristics.

According to the present invention, the PACSs are obtained according to an improved, so-called "clean" process, that is to say a process which produces virtually no by-products such as gypsum. In addition, the process according to the present invention leads to PACSs of high basicity having simultaneous characteristics of stability on storage, of elimination of the turbidity and of residual content of aluminium in the treated waters.

The PACSs according to the present invention may be used in many fields such as, for example, for treating drinking water, aqueous effluents and in the paper industry. Preferably, the PACSs of the present invention may advantageously be used for treating drinking water.

DRAWING

The attached FIGURE is a time-temperature graph wherein the hatched portion shows values of temperature and time which will yield the cooking step discovered by this invention to yield an unexpectedly improved process whereby essentially no by-products are formed. Heretofore, there was no appreciation that any combination of times and temperatures could lead to the "clean" process of the present invention.

The examples which follow illustrate the invention.

EXAMPLE 1

(In Accordance with the Invention)

500 g of a basic aluminium polychloride are introduced into a 2-liter reactor. This polychloride contains 11.18% aluminium based on Al$_2$O$_3$, 21.61% chloride and possesses a basicity of 42.9%. Its empirical formula is:

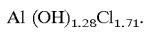

Al (OH)$_{1.28}$Cl$_{1.71}$.

19.2 g of lime Ca(OH)$_2$ are then added to the reactor containing the polychloride maintained at 50° C. The addition time is 45 minutes with Rushton-type stirring adjusted to 800 rev/min.

A basic solution of sodium carbonate and sodium sulphate is prepared according to the following procedure:

13.15 g of sulphuric acid at a concentration of 77.1% by mass are poured into a solution of sodium carbonate containing 68.5 g of Na$_2$CO$_3$.H$_2$O and 300 g of water.

This basic solution preheated to 50° C. is added, with vigorous turbulence, to the reactor containing the polychloride and Ca(OH)$_2$ maintained at 50° C., over 30 minutes.

At the end of the basification, the stirring speed is reduced to 200 revolutions/minute.

10 g of solid gypsum $CaSO_4.2H_2O$ are then added so as to have a constant concentration of $CaSO_4.2H_2O$, and the temperature is brought from 50° C. to 85° C. over 30 minutes, after which cooking is carried out for 1 h at 85° C. with stirring adjusted to 200 revolutions/minute.

The product is cooled to 40° C. over 30 minutes and then filtered. The gypsum is recyclable. The recovered filtrate, giving a titre of about 9% alumina, is diluted by adding water until a density of 1.203 is obtained, i.e. a weight content of alumina of 8.5%.

The chemical composition by weight, determined by analysis, is as follows:

$Al_2O_3$: 8.71%
$Ca^{2+}$: 0.99%
$Na^+$: 2.20%
$Cl^-$: 10.45%
$SO_4^{2-}$: 0.93%
water: 76.9% calculated by difference.

The reaction established from the reactants and by analysis of the finished products is as follows:

$Al(OH)_{1.28}Cl_{1.71}$ + 0.14 $Ca(OH)_2$ + 0.223 $Na_2CO_3$ + 0.057 $Na_2SO_4$ +

0.223 $H_2O$ 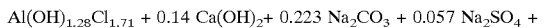 $Al(OH)_{2.01}Cl_{0.87}(SO_4)_{0.057}$ +

0.14 $CaCl_2$ + 0.560 $NaCl$ + 0.223 $CO_2$ resulting in a basicity of 2.01/3=67.1%

EXAMPLE 2

(In Accordance with the Invention)

500 g of a basic aluminium polychloride are introduced into a 2-liter reactor. This polychloride contains 18.33% aluminium based on $Al_2O_3$, 21.78% chloride and possesses a basicity of 43.1%. Its empirical formula is: $Al(OH)_{1.29}Cl_{1.71}$.

19.2 g of $Ca(OH)_2$ are then added to the reactor containing the polychloride maintained at 50° C. The addition time is 45 minutes with Rushton-type stirring adjusted to 800 rev/min.

A basic solution of sodium carbonate and sodium sulphate is prepared according to the following procedure:

13.15 g of sulphuric acid at a concentration of 77.1% by mass are poured into a solution of sodium carbonate containing 68.5 g of $Na_2CO_3.H_2O$ and 300 g of water.

This basic solution preheated to 50° C. is added, with vigorous turbulence, to the reactor containing the polychloride and $Ca(OH)_2$ maintained at 50° C., over 30 minutes.

At the end of the basification, the stirring speed is reduced to 200 revolutions/minute.

The temperature is brought from 50° C. to 85° C. over 15 minutes, after which cooking is carried out for 1 h at 85° C. with stirring adjusted to 200 revolutions/minute.

The product is cooled to 40° C. over 30 minutes and then clarified by filtration. The residue is less than 0.5 g/kg.

The recovered filtrate, giving a titre of about 9% alumina, is diluted by adding water until a density of 1.205 is obtained, i.e. a weight content of alumina of 8.5%.

The chemical composition by weight, determined by analysis, is as follows:

$Al_2O_3$: 8.64%
$Ca^{2+}$: 0.92%
$Na^+$: 2.25%
$Cl^-$: 10.21%
$SO_4^{2-}$: 0.92%
water: 76.9% calculated by difference.

The reaction established from the reactants and by analysis of the finished products is as follows:

$Al(OH)_{1.29}Cl_{1.71}$ + 0.15 $Ca(OH)_2$ + 0.229 $Na_2CO_3$ + 0.063 $Na_2SO_4$ +

0.229 $H_2O$ 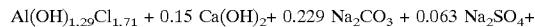 $Al(OH)_{2.03}Cl_{0.84}(SO_4)_{0.063}$ +

0.15 $CaCl_2$ + 0.584 $NaCl$ + 0.229 $CO_2$ resulting in a basicity of 2.03/3=67.7%

EXAMPLE 3

(In Accordance with the Invention)

The process is performed as in Example 2 with the same reactants, except that the temperature rise from 50° C. to 80° C. is performed over 30 minutes and the cooking temperature is 80° C. for 1 h 30 minutes with stirring adjusted to 200 revolutions/minute.

EXAMPLE 4

(In Accordance with the Invention)

The process is performed as in Example 2 with the same reactants, except that the temperature rise from 50° C. to 90° C. is performed over 30 minutes and the cooking temperature is 90° C. for 20 minutes with stirring adjusted to 200 revolutions/minute.

EXAMPLE 5

(In Accordance with the Invention)

The process is performed as in Example 2 with the same reactants, except that the temperature rise from 50° C. to 95° C. is performed over 30 minutes and the cooking temperature is 95° C. for 7 minutes with stirring adjusted to 200 revolutions/minute.

EXAMPLE 6

(Not in Accordance with the Invention)

The process is performed as in patent EP 0,557,153, except that sodium carbonate in solution is used instead of sodium carbonate powder. The cooking of our invention is not performed after the basification.

500 g of a basic aluminium polychloride are introduced into a 2-liter reactor. This polychloride contains 18.13% aluminium based on $Al_2O_3$, 21.47% chloride and possesses a basicity of 43.3%. Its empirical formula is: $Al(OH)_{1.30}Cl_{1.70}$.

A basic solution of sodium carbonate and sodium sulphate is prepared according to the following procedure:

13.15 g of sulphuric acid at a concentration of 77.1% by mass are poured into a solution of sodium carbonate containing 68.5 g of $Na_2CO_3.H_2O$ and 300 g of water.

This basic solution preheated to 60° C. is added, with vigorous turbulence, to the reactor containing the polychloride maintained at 60° C., over 20 minutes.

19.2 g of $Ca(OH)_2$ are added to the reactor containing the polychloride and the basic solution maintained at 60° C. The addition time is 45 minutes with Rushton-type stirring adjusted to 800 rev/min.

At the end of the calcium-basification, the stirring speed is reduced to 200 revolutions/minute.

The product is stirred for 30 minutes and is then cooled to 40° C. over 20 minutes and then filtered. The recovered filtrate, giving a titre of about 9% alumina, is diluted by adding water until a density of 1.204 is obtained, i.e. a weight content of alumina of 8.5%. It is stored at room temperature.

The chemical composition by weight, after analysis, is as follows:

$Al_2O_3$: 8.61%
$Ca^{2+}$: 0.95%
$Na^+$: 2.25%
$Cl^-$: 10.26%
$SO_4^{2-}$: 0.93%
water: 77.0% calculated by difference.

The reaction is as follows:

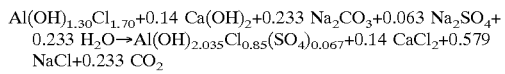

$Al(OH)_{1.30}Cl_{1.70}+0.14\ Ca(OH)_2+0.233\ Na_2CO_3+0.063\ Na_2SO_4+0.233\ H_2O \rightarrow Al(OH)_{2.035}Cl_{0.85}(SO_4)_{0.067}+0.14\ CaCl_2+0.579\ NaCl+0.233\ CO_2$ resulting in a basicity of 2.035/3=67.8%

EXAMPLE 7

(In Accordance with the Invention)

The product obtained after calcium-basification, according to Example 6, is heated to 70° C. over 20 minutes and cooking is then carried out at 70° C. for 2 h 30 with stirring adjusted to 200 rev/min. The residual content of aluminium in the treated water is improved by passing from 140% (obtained with the PACS according to the process of patent EP 327,419) to 120% with the product of the present example.

EXAMPLE 8

(In Accordance with the Invention)

The experiment described in Example 6 is repeated in a 200-liter reactor, except that $Ca(OH)_2$ is introduced first, followed by the mixture of sodium carbonate and sodium sulphate in solution to the level of the stirring paddle at 5 m/s through a nozzle. The cooking described in Example 7 is performed. After cooking for 2 h 30 min, a product is obtained which makes it possible to obtain a treated water containing 104% of the residual aluminium instead of 140% with the PACS manufactured according to Example 6 (PACS having undergone no cooking).

It was seen that with this type of cooking, at a temperature of 70° C., an amount of gypsum in suspension equal to about 200 g/ton was found in the liquid.

EXAMPLE 9

(In Accordance with the Invention)

500 g of a basic aluminium polychloride are introduced into a 2-liter reactor. This polychloride contains 18.33% aluminium based on $Al_2O_3$, 21.78% chloride and possesses a basicity of 43.1%. Its empirical formula is: $Al(OH)_{1.29}Cl_{1.71}$.

19.2 g of $Ca(OH)_2$ are then added to the reactor containing the polychloride maintained at 50° C. The addition time is 45 minutes with Rushton-type stirring adjusted to 800 rev/min.

A basic solution of sodium carbonate and sodium sulphate is prepared according to the following procedure:

13.15 g of sulphuric acid at a concentration of 77.1% by mass are poured into a solution of sodium carbonate containing 68.5 g of $Na_2CO_3.H_2O$ and 300 g of water.

This basic solution preheated to 50° C. is added, with vigorous turbulence, to the reactor containing the polychloride and $Ca(OH)_2$ maintained at 50° C., over 30 minutes.

At the end of the basification, the stirring speed is reduced to 200 revolutions/minute.

The temperature is brought from 50° C. to 60° C. over 10 minutes, after which cooking is carried out for 5 h at 60° C. with stirring adjusted to 200 revolutions/minute.

The product is cooled to 40° C. over 30 minutes and then filtered.

The recovered filtrate, giving a titre of about 9% alumina, is diluted by adding water until a density of 1.202 is obtained, i.e. a weight content of alumina of 8.5%.

The chemical composition by weight, determined by analysis, is as follows:

$Al_2O_3$: 8.46%
$Ca^{2+}$: 0.95%
$Na^+$: 2.25%
$Cl^-$: 10.07%
$SO_4^{2-}$: 0.95%
water: 77% calculated by difference.

The reaction established from the reactants and by analysis of the finished products is as follows:

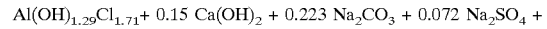
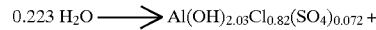

$Al(OH)_{1.29}Cl_{1.71}+0.15\ Ca(OH)_2+0.223\ Na_2CO_3+0.072\ Na_2SO_4+0.223\ H_2O \longrightarrow Al(OH)_{2.03}Cl_{0.82}(SO_4)_{0.072}+0.15\ CaCl_2+0.590\ NaCl+0.223\ CO_2$ resulting in a basicity of 2.03/3=67.7%

EXAMPLE 10

(In Accordance with the Invention)

500 g of a basic aluminium polychloride are introduced into a 2-liter reactor. This polychloride contains 18.13% aluminium based on $Al_2O_3$, 21.47% chloride and possesses a basicity of 43.3%. Its empirical formula is: $Al(OH)_{1.30}Cl_{1.70}$.

13.15 g of sulphuric acid at a concentration of 77.1% by mass are poured into the said polychloride at 50° C. over 14 minutes.

19.2 g of $Ca(OH)_2$ are then added at 50° C. The addition time is 45 minutes with Rushton-type stirring adjusted to 800 rev/min.

Once the addition of $Ca(OH)_2$ is complete, a solution of sodium carbonate containing 68.5 g of $Na_2CO_3.H_2O$ and 300 g of water is added with vigorous turbulence maintained at 50° C. over 20 minutes.

At the end of the basification, the stirring speed is reduced to 200 revolutions/minute and the product is heated to 70° C. over 15 minutes and then undergoes cooking at 70° C. for 2 h 30 min with stirring adjusted to 200 revolutions/minute.

The product is cooled to 40° C. over 20 minutes, filtered and diluted with 121 g of water.

The recovered filtrate has a density of 1.204, i.e. a weight content of alumina of 8.5%. It is stored at room temperature.

The chemical composition by weight, after analysis, is as follows:

$Al_2O_3$: 8.51%
$Ca^{2+}$: 0.92%
$Na^+$: 2.37%
$Cl^-$: 10.04%
$SO_4^{2-}$: 0.90%
water: 77.25% calculated by difference.
The reaction is as follows:

$Al(OH)_{1.30}Cl_{1.70} + 0.14\ Ca(OH)_2 + 0.254\ Na_2CO_3 + 0.056\ Na_2SO_4 + 0.254\ H_2O \longrightarrow Al(OH)_{2.08}Cl_{0.81}(SO_4)_{0.06} + 0.14\ CaCl_2 + 0.62\ NaCl + 0.254\ CO_2$ resulting in a basicity of 2.08/3=69.3%

EXAMPLE 11

(In Accordance with the Invention)

The same test as in Example 7 is performed, except that $Ca(OH)_2$ is introduced second and the mixture of basifying solution of carbonate and of sodium sulphate is introduced first.

The same analytical results are obtained as for the PACS of Example 7.

EXAMPLE 12

(In Accordance with the Invention)

750 g of a basic aluminium polychloride are introduced into a 2-liter reactor. This polychloride contains 18.33% aluminium based on $Al_2O_3$, 21.78% chloride and possesses a basicity of 43.1%. Its empirical formula is: $Al(OH)_{1.30}Cl_{1.70}$.

2:8.8 g of $Ca(OH)_2$ are added to the reactor containing the polychloride maintained at 50° C. The addition time is 45 minutes with Rushton-type stirring adjusted to 800 rev/min.

A basic solution of NaOH and sodium sulphate is prepared according to the following procedure:

19.7 g of sulphuric acid at a concentration of 77.1% by mass are poured into 363.4 g of an NaOH solution containing 6 mol of NaOH/l, followed by addition of 88.7 g of water.

This basic solution preheated to 50° C. is added, with vigorous turbulence, to the reactor containing the polychloride and $Ca(OH)_2$ maintained at 50° C., over 20 minutes.

At the end of the basification, the stirring speed is reduced to 200 revolutions/minute and the mixture is then left to stir for 10 minutes.

The temperature is brought from 50° C. to 70° C. over 25 minutes, after which cooking is carried out for 2 h 30 minutes at 70° C. with stirring adjusted to 200 revolutions/minute. The product is cooled to 40° C. over 30 minutes and then clarified by filtration. The residue is less than 0.2 g/kg.

The recovered filtrate, giving a titre of about 9% alumina, is diluted by adding water until a density of 1.202 is obtained, i.e. a weight content of alumina of 8.5%.

The chemical composition by weight, determined by analysis, is as follows:

$Al_2O_3$: 0.89%
$Ca^{2+}$: 0.89%
$Na^+$: 2.50%
$Cl^-$: 10.11%
$SO_4^{2-}$: 0.92%
water: 77.0% calculated by difference.

The reaction established from the reactants and by analysis of the finished products is as follows:

$Al(OH)_{1.29}Cl_{1.71} + 0.13\ Ca(OH)_2 + 0.536\ NaOH + 0.057\ Na_2SO_4 \rightarrow Al(OH)_{2.10}Cl_{0.78}(SO_4)_{0.057} + 0.13\ CaCl_2 + 0.65\ NaCl$ resulting in a basicity of 2.1/3=70.0%

EXAMPLE 13

(In Accordance with the Invention)

500 g of a basic aluminium polychloride are introduced into a 2-liter reactor. This polychloride contains 18.33% aluminium based on $Al_2O_3$, 21.78% chloride and possesses a basicity of 43.1%. Its empirical formula is: $Al(OH)_{1.29}Cl_{1.71}$.

30.06 g of calcium chloride are then added to the reactor containing the polychloride maintained at 50° C. The purity of the $CaCl_2$ is 96%, the remainder being NaCl and water. The addition time is 30 minutes with Rushton-type stirring adjusted to 800 rev/min. A further 15 minutes are required in order to dissolve the calcium chloride.

A basic solution of NaOH and sodium sulphate is prepared according to the following procedure:

13.15 g of sulphuric acid at a concentration of 77.1% by mass are poured into 325.8 g of an NaOH solution containing 6 mol of NaOH/liter, followed by addition of a further 42.7 g of water.

This solution is preheated to 50° C. and then added with vigorous turbulence at a linear rate of about 4 m/s into the reactor containing the polychloride and $CaCl_2$ maintained at 50°0 C., over 20 minutes.

At the end of the basification, the stirring speed is reduced to 200 revolutions/minute and the mixture is then left to stir for 10 minutes.

The temperature is brought from 50° C. to 70° C. over 25 minutes, after which cooking is carried out for 2 hours at 70° C. with stirring adjusted to 200 revolutions/minute.

The product is cooled to 40° C. over 30 minutes and then clarified by filtration. The residue is less than 0.1 g/kg.

The recovered filtrate is diluted by adding water until a density of 1.202 is obtained, i.e. a weight content of alumina of 8.5%.

The chemical composition by weight, determined by analysis, is as follows:

$Al_2O_3$: 8.00%
$Ca^{2+}$: 0.75%
$Na^+$: 3.05%
$Cl^-$: 10.68%
$SO_4^{2-}$: 0.85%
Water: 76.7% calculated by difference.

The reaction established from the reactants and by analysis of the finished products is as follows:

$Al(OH)_{1.29}Cl_{1.71} + 0.12\ CaCl_2 + 0.738\ NaOH + 0.056\ Na_2SO_4 \rightarrow Al(OH)_{2.05}Cl_{0.83}(SO_4)_{0.056} + 0.12\ CaC_2 + 0.85\ NaCl$ resulting in a basicity of 2.05/3=68.5%

EXAMPLE 14

(In Accordance with the Invention)

500 g of a basic aluminium polychloride are introduced into a 2-liter reactor. This polychloride contains 18.33% aluminium based on $Al_2O_3$, 21.78% chloride and possesses a basicity of 43.1%. Its empirical formula is $Al(OH)_{1.29}Cl_{1.71}$.

168.8 g of NaOH solution containing 6 mol of NaOH/l is diluted with 200 g of water. It is preheated to 50° C. and is then added over 20 minutes, with vigorous turbulence, into the reactor containing the polychloride maintained at 50° C.

19.2 g of $Ca(OH)_2$ are then added into the reactor containing the polychloride and the NaOH solution maintained at 50° C. The addition time is 45 minutes with Rushton-type stirring adjusted to 800 rev/min.

At the end of the basification, the stirring speed is reduced to 200 revolutions/minute and the mixture is then left to stir for 10 minutes.

18.7 g of anhydrous sodium sulphate are then added over ten minutes.

The temperature is brought from 50° C. to 70° C. over 25 minutes and cooking is then performed for 2 hours at 70° C. with stirring adjusted to 200 revolutions/minute.

The product is cooled to 40° C. over 30 minutes and then clarified by filtration.

The recovered filtrate is diluted by adding water until a density of 1.202 is obtained, i.e. a weight content of alumina of 8.5%.

The chemical composition by weight, determined by analysis, is as follows:

$Al_2O_3$: 8.51%
$Ca^{2+}$: 0.92%
$Na^+$: 2.30%
$cl^-$: 10.04%
$SO_4^{2-}$: 1.18%.
water: 77.0% calculated by difference.

The reaction established from the reactants and by analysis of the finished products is as follows:

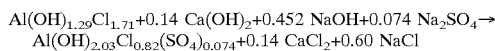

$$Al(OH)_{1.29}Cl_{1.71}+0.14\ Ca(OH)_2+0.452\ NaOH+0.074\ Na_2SO_4 \rightarrow Al(OH)_{2.03}Cl_{0.82}(SO_4)_{0.074}+0.14\ CaCl_2+0.60\ NaCl$$

resulting in a basicity of 2.03/3=67.7%

EXAMPLE 15

(In Accordance with the Invention)

500 g of a basic aluminium polychloride are introduced into a 2-liter reactor. This polychloride contains 18.54% aluminium based on $Al_2O_3$, 21.78% chloride and possesses a basicity of 43.7%. Its empirical formula is: $Al(OH)_{1.29}Cl_{1.71}$.

7.7 g of $Ca(OH)_2$ are then added to the reactor containing the polychloride maintained at 50° C. The addition time is 20 minutes with Rushton-type stirring adjusted to 800 rev/mnm.

A basic solution of sodium carbonate and sodium sulphate is prepared according to the following procedure:

1.1 g of sulphuric acid at a concentration of 77.1% by mass are poured into a sodium carbonate solution containing 76.1 g of $Na_2CO_3.H_2O$ and 300 g of water.

This basic solution preheated to 50° C. is added, with vigorous turbulence, to the reactor containing the polychloride and $Ca(OH)_2$ maintained at 50° C., over 30 minutes.

At the end of the basification, the stirring speed is reduced to 200 revolutions/minute.

The 20 g filter cake of solid gypsum $CaSO_4.2H_2O$ recovered from several tests identical to Example 1 is added to the reactor as a reactant to saturate the solution. An additional 10 g of gysum is added according to Example 1 and the temperature is brought from 50° C. to 85° C. over 30 minutes, then cooking is performed for 1 h at 85° C., with stirring adjusted to 200 revolutions/minute.

The product is cooled to 40° C. over 30 minutes and then filtered. The filtered gypsum, 8 g, may then be recycled again.

The recovered filtrate, giving a titre of about 9% alumina, is diluted by adding water until a density of 1.202 is obtained, i.e. a weight content of alumina of 8.5%.

The chemical composition by weight, determined by analysis, is as follows:

$Al_2O_3$: 8.47%
$Ca^{2+}$: 0.88%
$Na^+$: 2.40%
$Cl^-$: 10.05%
$SO_4^{2-}$: 1.25%
water: 77.0% calculated by difference.

The reaction established from the reactants and by analysis of the finished products is as follows:

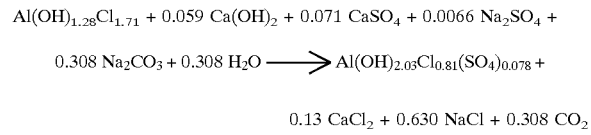

$$Al(OH)_{1.28}Cl_{1.71} + 0.059\ Ca(OH)_2 + 0.071\ CaSO_4 + 0.0066\ Na_2SO_4 + 0.308\ Na_2CO_3 + 0.308\ H_2O \longrightarrow Al(OH)_{2.03}Cl_{0.81}(SO_4)_{0.078} + 0.13\ CaCl_2 + 0.630\ NaCl + 0.308\ CO_2$$

resulting in a basicity of 2.03/3=67.7%

EXAMPLE 16

(Not in Accordance with the Invention)

According to Example No. 1 of Canadian patent application No. 2,109,756.

350.6 g of 50% basic polyaluminium chloride PAC 5/6 are placed in a 1-liter reactor equipped with a stirrer and a condenser. The PAC contains 12.39% aluminium and 8.27% chloride, i.e. $Al(OH)_{2.49}Cl_{0.51}$.

The solution is heated to 80° C a.nd 20° Baumé hydrochloric acid are then poured in over a period of 7 minutes. This acid of density 1.16 at 20° C. contains 32.14% HCl by mass. The temperature is increased to 95° C. and is then maintained for 1 hour with continuous stirring. The temperature is then reduced to 85° C. The composition of the reaction medium is as follows:

$Al_2O_3$: 8.32%
$Cl^-$: 11.96%
which corresponds to the formula

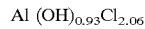

$Al(OH)_{0.93}Cl_{2.06}$ and to a basicity of 0.93/3=31%

31.3 g of 60° Baumé sulphuric acid are added over a period of 12 minutes. The sulphuric acid has a density of 1.71 at 15° C. and contains 78.5% $H_2SO_4$. The temperature is maintained at 85° C. for a further 30 minutes. The heating is stopped and the solution is left to cool to 40° C. over 2 hours. The stirring is continued.

280.6 g of water are then added with stirring at 40° C. The solution is clear, free of precipitate and stable for 30 days. Its chemical composition by weight, determined by analysis, is as follows:

$Al_2O_3$: 5.24%
$Cl^-$: 7.39%

$SO_4^{2-}$: 3.06%
which corresponds to the formula:

$$Al(OH)_{0.35}Cl_{2.06}(SO_4^{2-})_{0.31}$$

resulting in a basicity of 0.35/3=11.7%, whereas in the said Canadian patent application, the following final weight composition is indicated:

$Al_2O_3$: 10.36%
$Cl^-$: 8.84%
$SO_4^{2-}$: 2.93%
equivalent to the formula $$Al(OH)_{1.47}Cl_{1.23}(SO_4^{2-})_{0.15}$$

equivalent to a basicity of 1.47/3=49%

EXAMPLE 17

(Not in Accordance with the Invention)

The process is performed according to the conditions of Example 4 of patent FR 2,317,227, with the following reactants:

500 g of a basic polyaluminium chloride are introduced into a 2-liter reactor. This polychloride contains 16.58% aluminium based on $Al_2O_3$, 22.24% chloride and possesses a basicity of 43.7%. Its empirical formula is: $Al(OH)_{1.07}Cl_{1.93}$.

The polychloride is heated to 30° C. with Rushton-type stirring adjusted to 200 rev/min.

A basic solution of sodium carbonate is manufactured according to the following procedure:

44.29 g of $Na_2CO_3.H_2O$ are introduced into 141 g of water.

This basic solution preheated to 30° C. is added over 1 hour with vigorous turbulence into the reactor containing the polychloride maintained at 30° C.

88.9 g of sodium sulphate hydrate $Na_2SO_4.10H_2O$ are introduced into the reactor over 10 minutes and the stirring is then continued for 3 hours.

The density is 1.289. The chemical composition by weight, determined by analysis, is as follows:

$Al_2O_3$: 10.74%
$Na^+$: 3.70%
$Cl^-$: 14.50%
$SO_4^{2-}$: 3.52%
water: 67.54% calculated by difference.

The reaction established from the reactants and by analysis of the finished products is as follows:

$$Al(OH)_{1.07}Cl_{1.93}+0.17\ Na_2SO_4+0.38\ Na_2CO_3+0.38\ H_2O \rightarrow Al(OH)_{1.48}Cl_{1.18}(SO_4)_{0.17}+0.76\ NaCl+0.38\ CO_2$$

resulting in a weak basicity of 1.48/3=49.3%

The product manufactured above may be written in the form $$Al(OH)_{1.48}Cl_{1.94}(SO_4)_{0.17}Na_{0.76},$$

which is in accordance with the product described in U.S. Pat. No. 2,317,227 having the following formula:

$$Al(OH)_{1.48}Cl_{1.95}(SO_4)_{0.15}Na_{0.73}$$

EXAMPLE 18

(Not in Accordance with the Invention)

If the product obtained according to Example 17—which product contains no basic compound of an alkaline-earth metal—is cooked at 80° C. for 20 minutes, it is observed that the PACS solutions obtained are not stable over time, either at room temperature or at 45° C. A large amount of solids are deposited at the bottom of the flasks.

Before collating, in a table, all the results of the tests of applications in water treatment of the products of the above examples, methods for evaluating the products are described.

MEASUREMENT OF THE RESIDUAL TURBIDITY

A PACS obtained according to patent EP 327,419 will be used as reference product, leading to a gypsum effluent of 350 kg per ton of PACS, and which has the following chemical formula by weight:

$Al_2O_3$: 8.5%
$Ca^{2+}$: 1.23%
$Cl^-$: 6.44%
$SO_4^{2-}$: 1.53%
Basicity of 69.6%

20 liters of water from the river Seine are introduced into a 30-liter tank on the eve of the measurement to allow the water to reach room temperature.

This water contains the following salts: $Na_2SO_4$, $NaHCO_3$, $CaCl_2$, $MgCl_2$. It is maintained under constant stirring at 100 revolutions/minute. The following amounts of salt (expressed in mg) are in 1 liter of this water:

| $Na_2SO_4$ | $NaHCO_3$ | Calcium | Magnesium | Clays | Organic materials |
|---|---|---|---|---|---|
| 74 | 336 | 80 | 12.2 | 50 | 14 |

This water has a turbidity of 9 to 10 NTU and a pH of 8.2 to 8.5.

The tests are performed on a Hydrocure flocculator (from Orchidis) in the following way:

introduction into each "Jar-Test" flask of one liter of water from the river Seine, stirred at 100 revolutions/minute, preparation of solutions of the PACS samples to be tested and of the reference product, by approximately one-hundredfold dilution of the products obtained in demineralized water, followed by leaving the solutions to stand for 1 hour, i.e. 2.94 g of reference PACS giving a titre of 8.5% $Al_2O_3$ introduced into the 250 ml flask made up with water, the solutions are stable upon dilution for at least 2 hours, taking the required amounts of product, 3 ml, with syringes (solutions diluted one-hundredfold, giving a titre of 1 g/l of $Al_2O_3$), increasing the stirring speed of the flocculator to 160 revolutions/minute, injecting the products, i.e. 3 mg based on $Al_2O_3$ per liter of Seine water, into the "Jar-Test" flasks, starting the chronometer and counting 1 min 30 s to the end of injection, after rapid stirring for 1 min 30 s, the stirring speed is slowed down to 40 revolutions/minute, after 13 min 30 s at 40 revolutions/minute, the stirring is stopped and the stirrer paddles are lifted, after settling for 20 minutes, a withdrawal tube from the peristaltic pump is introduced into each flask to a depth of 5 cm below the surface and in the centre of the flask.

The pump is switched on and about 40 ml are withdrawn. The withdrawal rate of the pump is adjusted such that the withdrawal time does not exceed 3 min. These samples will be intended for measuring the residual turbidity. The measurement is taken on a Ratio/XR Hach turbidimeter.

The results are expressed in NTU (=Nephelometric Turbidity Unit), this unit correlating to the residual amount of particles in the treated waters.

Four tests are carried out.

The turbidity value $T_p$, or $T_r$ for the reference PACS, is measured for each test and for each product and the difference in elimination of turbidity is then expressed according to the following relationship:

Average NTU in % =average of $(Tp_{1to4}/Tr_{1to4}) \times 100$

Standard deviation as a percentage on the sum of the ratios $(Tp_{1to4}/Tr_{1to4}) \times 100$

MEASUREMENT OF THE RESIDUAL ALUMINIUM

This test is carried out on the samples after settling for 20 minutes. The supernatant solutions are filtered through 0.45 μm Millipore membranes. The addition of one drop of Ultra-Pur concentrated nitric acid avoids any precipitation of aluminium. The measurement is taken by Electrothermic Atomic Absorption NFT 90-119 1993. The unit is the μg/l.

The residual content of aluminium Alp, or Alr for the reference PACS, is measured for each test and for each product and the difference in residual content of aluminium is then expressed according to the following relationship:

Average of $Al_{res}$ in %=average of $(Alp_{1to4}/Alr_{1to4}) \times 100$

Standard deviation as a percentage on the sum of the ratios $(Alp_{1to4}/Alr_{1to4}) \times 100$

STABILITY AT 40° C.

This stability is given relative to the appearance of solid at the bottom of the flasks, either in crystalline form or in the form of cloudiness with a flaky deposit. It must be at least 1 month.

STABILITY AT ROOM TEMPERATURE

This stability is given relative to the appearance of solid at the bottom of the flasks. It must be at least 3 months. The stabilities are determined on PACS solutions having a weight amount of $Al_2O_3$ at least equal to 8%.

The results are collated in the table below.

In this table:

NA: example not in accordance with the invention.

NTU (%) represents the average NTU in % according to the relationship mentioned above.

$Al_{res}$ (%) represents the average $Al_{res}$ in % according to the relationship mentioned above.

++++ means very large

+++ means average

++ means poor

+ means very poor

| Examples | NTU (in %) | $Al_{res}$ (in %) | appearance flocs | STABILITY At 25° C. | At 40° C. |
|---|---|---|---|---|---|
| Example 1 | 103 ± 9 | 106 ± 5 | coarse | >3 months | >1 month |
| Example 2 | 118 ± 18 | 97 ± 15 | coarse | >3 months | >1 month |
| Example 3 | 105 ± 10 | 110 ± 10 | coarse | >3 months | >1 month |
| Example 4 | 160 ± 25 | 119 ± 13 | coarse | >3 months | >1 month |
| Example 5 | 100 ± 15 | 114 ± 7 | coarse | >3 months | >1 month |
| Example 6 NA | 75 ± 10 | 140 ± 9 | medium | >3 months | >1 month |
| Example 7 | 90 ± 10 | 120 ± 10 | coarse | >3 months | >1 month |
| Example 8 | 101 ± 15 | 105 ± 4 | coarse | >3 months | >1 month |
| Example 9 | 90 ± 20 | 116 ± 2 | coarse | >3 months | >1 month |
| Example 10 | 96 ± 20 | 116 ± 7 | coarse | >3 months | >1 month |
| Example 11 | 92 ± 11 | 117 ± 8 | coarse | >3 months | >1 month |
| Example 12 | 94 ± 13 | 107 ± 7 | coarse | >3 months | >1 month |
| Example 13 | 90 ± 5 | 122 ± 3 | coarse | >3 months | >1 month |
| Example 14 | 91 ± 7 | 125 ± 3 | coarse | >3 months | >1 month |
| Example 15 | 120 ± 40 | 101 ± 15 | medium | >3 months | >1 month |
| Example 16 NA | 212 ± 32 | 170 ± 20 | medium | >3 months | >1 month |
| Example 17 NA | 70 ± 9 | 193 ± 12 | coarse | <2 months crystal ++++ | <½ month crystal ++++ |
| Example 18 NA | 250 ± 30 no flocculation | non-representative filtration | no flocs | <1 month crystal ++++ | <¼ month crystal ++++ |
| Reference PACS | 100 | 100 | medium | >3 months | >1 month |

It is seen that the products obtained according to the present invention (Examples 1 to 5 and 7 to 15):

are stable (>3 months at room temperature and >1 month at 40° C.), make it possible to obtain treated waters having a residual concentration of aluminium of less than 125% of reference PACS, and allow an efficacy of flocculation of less than 125% relative to the reference PACS.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The entire disclosure of all applications, patents and publications, cited above, and of corresponding French application 96/02947, are hereby incorporated by reference.

What is claimed:

1. A process for the preparation of polyaluminum chlorosulphate of high basicity, having the general formula:

$$Al(OH)_aCl_bY_c/dM'Cl_2/eM''Cl \qquad (I)$$

in which

Y represents $SO_4^{2-}$,

M' represents an alkaline-earth metal cation,

M'' represents an alkali metal or ammonium cation, a, b, c and d are non-zero positive integers or positive fractions and e is zero or a positive integer or positive fraction such that 1.8<a<2.25

0.001<c<0.150 b=3−2c−a and $2d+e+b \leq 3$, and having a basicity β between 60% and 75%, said basicity being defined by the formula $$\beta = 100 \times (3Al+2M'+M''-2Y-Cl)/3Al$$

in which Al, M', M", Y and Cl are expressed in moles, said process comprising placing a basic compound of an alkali metal optionally in aqueous solution and at least one basic compound of an alkaline-earth metal or a halide of an alkaline-earth metal, in aqueous suspension or in powder form, in the presence of sulphate ions, in contact with a basic solution of aluminum chloride of formula:

$$Al(OH)_xCl_y \qquad (II)$$

in which x is a number between 0.1 and 1.5 and y=3−x, cooking the resultant reaction medium at a temperature between 60° C. and 95° C. for a cooking time between 5 minutes and 20 h, and under time-temperature cooking conditions sufficient to produce the resultant product polyaluminum chlorosulphate of high basicity.

2. A process according to claim 1, wherein the cooking temperature is 60° C., and the cooking time is between 5 h and 9 h.

3. A process according to claim 1, wherein the cooking temperature is 95° C., and the cooking time is between 7 minutes and 10 minutes.

4. A process according to claim 1, wherein the cooking temperature is 70° C., and the cooking time is between 1 h and 5 h.

5. A process according to claim 4, wherein the cooking temperature is 70° C., and the cooking time is between 1 h and 4 h.

6. A process according to claim 1, wherein the cooking temperature is 80° C., and the cooking time is between 10 minutes and 1 hour 45 minutes.

7. A process according to claim 6, wherein the cooking temperature is 80° C., and the cooking time is between 30 minutes and 1 hour 30 minutes.

8. A process according to claim 1, wherein the cooking temperature is 85° C., and the cooking time is between 10 minutes and 1 hour 45 minutes.

9. A process according to claim 8, wherein the cooking temperature is 85° C., and the cooking time is between 30 minutes and 1 hour.

10. A process according to claim 1, wherein the cooking temperature is 90° C., and the cooking time is between 5 minutes and 45 minutes.

11. A process according to claim 10, wherein the cooking temperature is 90° C., and the cooking time is between 7 minutes and 10 minutes.

12. A process according to claim 1, wherein the basic compound of an alkali metal is NaOH, KOH, $NaHCO_3$, $Na_2CO_3$, $K_2CO_3$ or $KHCO_3$, or mixtures of at least two of said basic compounds.

13. A process according to claim 12, wherein the basic compound of an alkali metal comprises NaOH or $Na_2CO_3$.

14. A process according to claim 1, wherein the basic compound of an alkaline-earth metal is CaO, MgO, $Ca(OH)_2$, $AMg(OH)_2$, or $CaCO_3$, or a mixture of at least two of said basic compounds of an alkaline-earth metal.

15. A process according to claim 14, wherein the basic compound of an alkaline-earth metal is $Ca(OH)_2$, $Mg(OH)_2$ or MgO.

16. A process according to claim 1, wherein the halide of an alkaline-earth metal is $CaCl_2$ or $MgCl_2$.

17. A process according to claim 14, wherein the halide of an alkaline-earth metal is $CaCl_2$.

18. A process according to claim 1, wherein the basicity β of the high-basicity polyaluminium chlorosulphate of formula (I) is between 65% and 70%.

19. A process according to claim 1, wherein the temperature and time of the cooking step are represented in the hatched portion of the FIGURE.

* * * * *